April 18, 1944. S. S. MATTHES Re. 22,472

TROLLEY WIRE HANGER

Original Filed Sept. 14, 1939

Inventor

SAMUEL S. MATTHES

By Alfred F. Rees

Attorney

Reissued Apr. 18, 1944 Re. 22,472

UNITED STATES PATENT OFFICE 22,472

TROLLEY WIRE HANGER

Samuel S. Matthes, Mansfield, Ohio, assignor to The Ohio Brass Company, Mansfield, Ohio, a corporation of New Jersey Original No. 2,239,792, dated April 29, 1941, Serial No. 294,909, September 14, 1939. Application for reissue April 1 1942, Serial No. 437,281

10 Claims. (Cl. 174—160)

My invention relates to hangers or supports for trolley wires or other conductors whereby the trolley wire may be suspended from or supported by an overhead support which may be a cable or wire spaced from the trolley wire or conductor and which is parallel to, at right angles to or obliquely disposed to the trolley wire or other conductor.

Another object of my invention is to make certain parts adjustable to permit accommodating the device to different relations of the supporting cable or wire to the trolley wire.

A still further object of my invention is to permit the same to be applied to the supporting cable or wire without disassembling the parts.

My invention is provided with clamping plates or jaws between which the cable or wire or other device supporting the same is clamped, and these plates or jaws are rotatable relative to the other parts of the device and are movable laterally relative thereto within the limits of construction. These jaws or plates are also locked against relative rotation when the device is installed on the support.

My invention resides in the new and novel construction, combination and relation of the parts herein described and shown in the drawing accompanying this specification.

Figure 1:
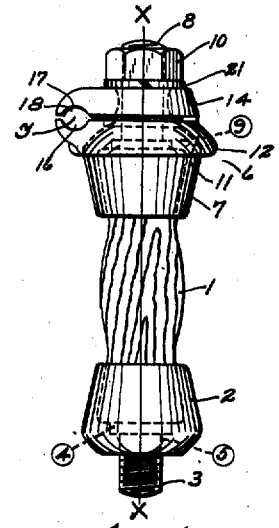
Fig. 1 is a side view of my invention.
Figure 2:
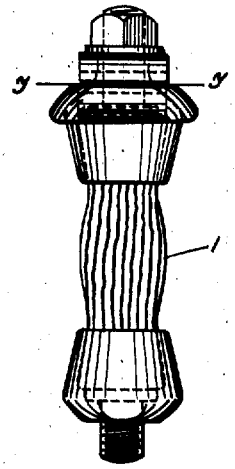
Fig. 2 is another side view of my invention shown in Fig. 1 but rotated through 90° about the longitudinal axis $x—x$.

In the preferred embodiment of my invention, I employ an insulator member 1 which may be of wood or molded composition or other suitable material and of such shape as will suit requirements. In the present disclosure I have shown the member 1 as being an elongated member having enlarged tapered heads. To the lower head is attached a cup-shaped member 2 of metal with the sides drawn into engagement with the sides of the head thereby holding the parts in assembled relation.

Projecting from the member 2 is a threaded stud 3 to which may be attached a trolley wire clamp or ear, as shown in United States Patents 1,461,752 of July 17, 1923, and 2,027,604 of January 14, 1936, or other suitable device. The stud 3 is provided with an enlarged head 4 positioned within the cap 2. The stud 3, however, may be threaded throughout its length and positioned in a threaded opening in the cap as at 5.

Also, attached to the insulator member 1 but in spaced relation to the cup 2 is means 6 for attaching the device to an overhead support which may be a cable or a wire or other suitable means, but which I include in the terms hereinafter used as a cable or support.

The means 6 comprises an inverted cup-shaped member 7 similar to the cup 2 and attached to the other head of the insulator member 1 in the same manner.

Projecting from the member 7 is the fixed threaded stud 8 with a head 9 positioned within the cap 7. Mounted on the stud 8 is a nut 10.

The end face 11 of the cap 7 is spherical or arcuate in shape and convex, and provides a bearing surface for the clamping member 12 which is provided with a concave bearing surface to engage the bearing surface 11 and which is curved to correspond with that of the surface 11.

The member 12 is provided with an opening 13 which is considerably larger than the stud 8 thereby offering considerable space between the side of the opening 13 and the stud 8. It will be evident therefore that the jaw 12 may be rotated about the axis $x—x$ and also rocked laterally upon the surface 11 in a plane common with the axis $x—x$ depending upon the clearance between the stud 8 and the wall of the opening 13. This permits the hanger to be applied to overhead constructions in which the support or cable presents various angular relations to the trolley wire.

Figure 3:
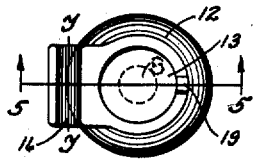
Fig. 3 is an upper face view of the lower clamping member.
Figure 4:
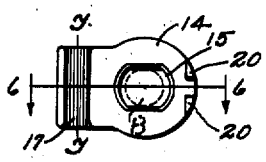
Fig. 4 is a lower face view of the upper clamping member.
Figure 5:
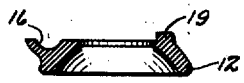
Fig. 5 is a section on the line 5—5 of Fig. 3.
Figure 6:
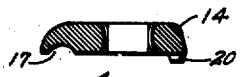
Fig. 6 is a section on the line 6—6 of Fig. 4.

My invention is also provided with a clamping jaw or member 14 provided with an opening 15 through which extends the stud 8 which is shown in dotted lines in both Figs. 3 and 4.

In Fig. 4 the opening 15 is shown as elongated with considerable space relative to the stud 8 in one direction but considerably less clearance in the other direction thus permitting considerable lateral adjustment in one direction normal to the axis $x—x$ but quite limited lateral adjustment in the other direction.

The clamping members 12 and 14 are provided with grooves 16 and 17 respectively and which cooperate to form the opening 18 constituting a transversely disposed gripping seat adopted to receive cable or other support.

The clamping members 12 and 14 are spaced somewhat apart which permits drawing them into clamping relation with the cable or support which may vary in diameter within limits.

The clamping member 12 is provided at one point, preferably opposite the groove 16 with an upwardly projecting lug 19 and the clamping member 14 is provided with spaced lugs 20 projecting downwardly and placed opposite the groove 17 and between which lugs 20 the lug 19 is positioned. Either the lugs 20 or the lug 19 or both may engage the adjacent surface of the cooperating jaw and act as a fulcrum or pivot when the clamping members are brought into engagement with the cable or other support.

The described interlocking of the lugs 19 and 20 prevent relative rotation of the members 12 and 14 without checking their relative lateral movements. Such rotation is also prevented by the clamping of the members 12 and 14 upon the cable.

The axis $y—y$ of the opening 18 is spaced a considerable distance from the axis $x—x$ and from the disclosure it will be apparent that this axis may take varying angular positions about the axis $x—x$ since it is rotatable about the axis $x—x$ in a plane at right angles thereto and also the lateral movement of the jaws may change to a small extent the spacing between the axes $x—x$ and $y—y$.

By the use of the term "lateral" or "laterally" in the appended claims, I mean a movement normal to the axis $x—x$ as in the case of jaw 14 and by "rocked" or "rocking" I refer to a movement of the jaw 12 relative to the axis $x—x$ due to the curved or bearing faces on the cap 7 and jaw 12, and by "rotate" or "rotatably" I refer to the rotation of the jaws about the axis $x—x$ as in a plane normal to the axis.

My invention may be installed by first attaching the trolley wire clamp or ear to the trolley wire and then rotating the stud 3 into position with respect to the clamp or ear, or the clamp or ear may be first attached to the stud 3 and then to the trolley wire.

The nut 10 is then rotated to loosen the jaws 12 and 14 relative to each other to permit them to open sufficiently to receive the cable or other support within the opening 18, the jaws being adjustable relative to the cap 7 while the jaws are being positioned upon the support.

If the cable or other support to be clamped in the opening 18 is considerably larger in diameter than that of the opening 18, the spherical surface on the members 7 and 12 will permit the member 12 to adjust its position spherically with respect to the cap 7 and the jaw 14 and axis $x—x$ whereby the jaws will open farther on the groove side to accommodate the larger cable. The flat bearing faces in engagement between the jaw 14 and the washer 21 or nut 10 holds the jaws 14 normal to the axis $x—x$ when the jaws are tightened upon a cable, thus forcing the jaw 12 to adjust itself to meet the requirements.

The nut 10 is then rotated into clamping position and the interposed spring washer 21 will prevent the back rotation of the nut 10.

The stud 8 and nut 10 may have substituted therefor a so-called cap screw in which the nut is a fixed part of the threaded stud and in this case the upper end of the cap 7 will be threaded to receive the threaded end of the cap screw. The result in this case is the same as with the use of the stud 8 and the nut 10.

It is usual to position the hanger so that the axis $x—x$ will be vertical or substantially so, but the device may be used in any other position as, for instance, in a substantially horizontal position as when used as a strain member.

The offset groove 18 spaced from the axis $x—x$ avoids the necessity of removing the nut 10 and the jaw 14 from the device in order to position it on the supporting cable as would be the case if the axis $y—y$ intersected the axis $x—x$.

Modifications will suggest themselves to those skilled in the art and, therefore, I wish to be limited only by my claims.

I claim:

1. Means for supporting a trolley wire from an overhead cable comprising an insulator, a fitting secured to said insulator and having an external arcuate bearing surface thereon, a threaded stud projecting from said fitting, a clamp mounted on said fitting and having an opening through which the stud projects and also being provided with an arcuate bearing surface to cooperate with the first arcuate surface to permit the clamp to rock upon the arcuate surfaces, the opening in the clamp being larger than the stud whereby the amount of rocking movement of the clamp relative to the stud is limited by the size of the said opening, the said clamp being rotatable about the axis of the stud, a second clamp mounted on said fitting and provided with an elongated opening through which said stud extends, said last named opening permitting the second named clamp to move laterally and to rotate in a plane, normal to the axis of the stud, elongated cooperating grooved means on each clamp to receive a supporting cable, the longitudinal axis of the said cooperating grooved means being spaced from and transverse to and in a plane substantially normal to the axis of the stud, interlocking means on the clamps cooperating to prevent the clamps from rotating relative to each other, and threaded means on the stud to move longitudinally thereof when rotated to force the clamps into holding engagement with a cable, the arcuate surfaces on said fitting and first mentioned clamp and the openings through said clamps for said stud providing a mounting for said clamps whereby the first said clamp may rock upon the arcuate surfaces to adjust itself to the size of cable positioned in the grooves of the clamps, and the second clamp may be moved laterally of the stud to adjust the grooved means thereon to that on the first clamp.

2. Means for attaching a trolley wire to an overhead cable which is laterally disposed relative to the vertical axis of the attaching means, said means comprising an insulator, a fitting for supporting the insulator, said fitting being provided with an external spheric bearing surface and having a threaded stud projecting from said surface, a clamp mounted on the said spheric surface curved to correspond to the first said spheric surface and cooperating with the first said spheric surface to effect a rocking movement of the clamp relative to the fitting in all directions, said clamp having an opening therethrough for said stud the amount of the said movement being limited by the walls of the opening through the clamp, a second clamp comprising a plate-like member provided with an opening through which projects the stud, the opening through said second clamp being oblong to permit the clamp to move laterally of the stud in a plane normal to the stud axis and to rotate about the axis of the stud, the last said clamp being mounted above the first clamp and provided with means cooperating with the other clamp to form a fulcrum, each clamp provided with a groove cooperating with a groove on the other clamp to form an elongated opening to receive and grip a supporting cable, the said elongated opening having its longitudinal axis spaced laterally from the axis of the stud and extending transversely thereof, the upper surface of the second clamp being substantially flat, threaded means on the stud to force the second clamp towards the first clamp and into clamping engagement with a cable in the grooves, said spheric surfaces and the openings through said clamps for said stud providing a mounting for said clamps whereby the first said clamp may rock upon said spheric surfaces relative to the axis of said stud to permit the first said clamp to adjust itself to the size of a cable in the grooves, and means associated with the insulator to attach a trolley wire thereto.

3. An adjustable hanger for attachment to a span wire comprising, a body member having a substantially spherical projection on the upper side, a support member positioned below the wire having an opening therethrough with a substantially spherical recess at one end to receive the spherical projection of the body member, a member positioned above the span wire, and means for baising the members together to simultaneously grip the span wire and lock the spherical projection in fixed relation to the recess.

4. A hanger for attachment to a span wire comprising, a body member, support means including a member positioned between the span wire and the body member having an opening therethrough with a substantially spherical bearing surface at one end, and a clamp member positioned on the other side of the span wire, means on the upper side of the body member associating the body member and said support means including a portion projecting through the said opening and a substantially spherical surface portion engaging the bearing surface of the support means, and means associated with the clamp member and the other said member of the support means adjustable to secure the substantially spherical portion and the bearing surface of the support member in fixed relation and to clamp the wire firmly between the clamp member and said other member of the support means.

5. In a wire hanger; a body member; an insulator element fixed in said body member; said body member having a spherical seat formed thereon; a first member having a socket cooperating with said spherical seat; a second member cooperating with said first member; each of said members provided with opposed wire gripping seats; said members being rotatably movable about the longitudinal axis of said insulator; and means to lock said body member and said members in position.

6. The combination in a hanger disposed to be secured to a span wire, of a body member, a hanger member having a groove on the lower side to receive the span wire positioned above the body member for movement relative thereto, means cooperative with the hanger member to secure the span wire in the groove and having a socket to receive a portion of the body member positioned between the hanger member and the body member, and means cooperative with the hanger member and the said means to simultaneously secure the hanger member in fixed relation to the span wire and prevent movement of the body member relative to the clamp member.

7. The combination in a support for attachment to a span wire, of a body member having a substantially spherical bearing surface positioned on the outer surface, a clamp member having an elongated groove on the lower side to receive the span wire, means including an intermediate member having a recess for receiving the spherical bearing surface of the body member positioned between the body member and the clamp member to suspend the body member therefrom in movable relation, and means cooperative with the clamp member and the intermediate member for simultaneously securing the span wire to the clamp member and locking the body member and clamp member in immovable relation.

8. In a trolley wire hanger in combination, a body member for attachment to a span wire for supporting a trolley wire, support means comprising a member positioned below the span wire having a groove on the upper side to receive the span wire associated with the body member for movement relative thereto and a clamp member positioned on the upper side of the said member, and means cooperative with the members of the support means to secure said members in fixed relation to the span wire and the body member.

9. In a trolley wire hanger; an insulator; means secured to one end of said insulator for holding a trolley wire thereon; a fitting secured to the other end of said insulator having an upper convex surface; a stud extending from said convexed surface fitting; a pair of clamping jaws mounted on said convex surface, said clamping jaws having openings through which said stud extends; each of said clamping jaws having a complemental wire receiving groove, the longitudinal axis of said grooves displaced from the longitudinal axis of said insulator; and a nut on said stud for clamping said jaws together and to said fitting.

10. In a trolley wire hanger, an insulator; a fitting secured to one end of said insulator provided with a convex surface; a stud extending from said fitting; a clamping jaw having a concave surface engaging said convex surface and having an opening through which said stud extends; a second clamping jaw axially movable with respect to the axis of said insulator cooperating with said first jaw and having an opening through which said stud extends; each of said clamping jaws having a complemental wire receiving groove, the longitudinal axis of said grooves displaced from the longitudinal axis of said insulator; and a nut on said stud for clamping said jaws together and for holding said jaws in different fixed positions of adjustment on said fitting.

SAMUEL S. MATTHES.